(12) United States Patent
Leadbeater

(10) Patent No.: US 6,261,620 B1
(45) Date of Patent: Jul. 17, 2001

(54) METHOD AND APPARATUS FOR MOLDING A FOOD PRODUCT

(75) Inventor: John Michael Leadbeater, York (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/453,944

(22) Filed: May 24, 2000

(30) Foreign Application Priority Data

Jun. 28, 1999 (GB) .................................................. 9915059

(51) Int. Cl.⁷ ................................ A23P 1/00; B29C 35/00
(52) U.S. Cl. ............................ 426/515; 62/346; 165/89; 425/363; 426/512; 426/660
(58) Field of Search ..................................... 426/512, 515, 426/524, 660; 425/363, 446; 62/346; 165/89

(56) References Cited

U.S. PATENT DOCUMENTS

| | | | |
|---|---|---|---|
| 4,068,993 | 1/1978 | Decey et al. | 425/104 |
| 4,468,186 | 8/1984 | Sollich | 425/294 |
| 5,078,204 | 1/1992 | Loffredo et al. | 165/89 |
| 5,187,947 | * 2/1993 | Breunig et al. | 62/346 |
| 6,129,940 | * 10/2000 | Leadbeater | 426/515 |

FOREIGN PATENT DOCUMENTS

| | | |
|---|---|---|
| 520794 | 5/1940 | (GB) . |
| 641682 | 8/1950 | (GB) . |
| 1473906 | 5/1977 | (GB) . |

* cited by examiner

Primary Examiner—George C. Yeung
(74) Attorney, Agent, or Firm—Winston & Strawn

(57) ABSTRACT

A method and apparatus for molding and fast chilling food products, preferably confectionery products. The method involves sequentially depositing a solidifiable food substance into one or molds that are part of a plurality of molds radially attached to a chilled roller while the molds are in a substantially horizontal position. The chilled roller is then rotated to move the one or more molds filled with the food substance into contact with a conveyor belt sufficiently soon after the solidifiable food substance is deposited in the molds so as to avoid the exterior surface of the food substance from becoming distorted when the molds move away from the horizontal. The chilled roller at least partly solidifies the food substance in the molds. The at least partially solidified food substance is then separated from the molds onto the conveyor belt. A second method involves sequentially depositing a solidifiable food substance into one or molds that are part of a plurality of molds radially attached to a chilled roller while the molds are in a substantially horizontal position and lowering a chilled plate onto the molds while the solidifiable food substance is being deposited into the mold. The chilled plate contacts the solidifiable food substance to at least partially solidify the exterior surface of the food substance. The chilled roller at least partly solidifies the food substance in the molds. The chilled plate is then removed from the surface of the molds, the molds are rotated, and the partially solidified food substance is separated from the molds.

12 Claims, 5 Drawing Sheets

METHOD AND APPARATUS FOR MOLDING A FOOD PRODUCT

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

TECHNICAL FIELD

The present invention relates to a method for molding food products and an apparatus for use with the method. In particular the method and apparatus are directed to the molding of confectionery products such as gels, gums, high-boiled sweets, chocolate, and fat-based products.

BACKGROUND

Food products, in particular confectionery products, can be produced using chilled rollers, such as disclosed in U.S. Pat. No. 5,078,204 and GB 641,682. The methods disclosed in these patents use a pair of counter-rotating rollers with cavities on their surfaces in order to form shaped confectionery products that are linked together by a thin web of confectionery product. GB 641,982 is directed to the production of chocolate confectionery articles only and the problems associated with adherence of chocolate to surfaces of the rollers. In U.S. Pat. No. 5,078,204 the molded product is in the form of a solid ribbon that requires further processing.

It would be desirable to have a molding process that avoids the problems associated with forming a web that links the molded confectionery products and avoids the need for further processing after molding.

SUMMARY OF THE INVENTION

The invention is directed to an apparatus and a method for making a molded food product. One embodiment of the food product molding apparatus includes a chilled roller, a plurality of molds attached radially to the surface of a chilled roller, a depositor for sequentially depositing a solidifiable food substance into one or more of the molds when the molds are in a substantially horizontal position to provide one or more molds filled with a food substance having an exterior surface, a conveyor belt arranged to contact the exterior surface of the food substance in the one or more molds sufficiently soon after the solidifiable food substance is deposited into the molds to prevent the exterior surface of the food substance from being distorted as the molds move away from the horizontal position, and a means for separating the food substance from the molds. The temperature of the chilled roller is sufficiently low to at least partially solidify the solidifiable food substance before it is separated from the mold.

The conveyor belt may be arranged to contact the exterior surface of the food substance before the molds have moved more than 90 degrees with respect to the position of the molds when they are being filled or it may be arranged to contact the exterior surface of the food substance before the molds have moved more than 60 degrees with respect to the position of the molds when they are being filled. The conveyor belt may remain in contact with the exterior surface of the food substance during an angular motion of the molds of at least 90 degrees before the food substance is separated from the molds or the conveyor belt may remain in contact with the exterior surface of the food substance during an angular motion of the molds of at least 120 degrees before the food substance is separated from the molds.

The means for separating the partly solidified food substance from the molds may involve introducing compressed air into a cavity behind each mold or introducing compressed air through air nozzles at the bottom of each mold.

In another embodiment, the food product molding apparatus includes a chilled roller, a plurality of molds attached radially to the surface of the chilled roller, a depositor for sequential depositing a solidifiable food substance into one or more of the molds when the molds are in a substantially horizontal position, to provide one or more molds filled with a food substance that has an exterior surface, a chilled plate that comes in contact with one or more filled molds while the food substance is being deposited in the molds so that the chilled plate contacts the molds and the exterior surface of the food substance, and a means for separating the food substance from the molds, wherein the temperature of the chilled roller is sufficiently low to at least partially solidify the solidifiable food substance before it is separated from the molds.

The means for separating the food substance from the molds may involve introducing compressed air into a cavity behind each mold or introducing compressed air through air nozzles at the bottom of each mold. In another embodiment the means for separating the food substance from the molds includes a perforated conveyor belt and a vacuum source positioned on the side of the conveyor belt opposite to the side that contacts the food product wherein the vacuum source generates a sufficient vacuum to pull the food substance from the mold when the mold passes over the conveyor belt. In yet another embodiment the means for separating the food substance from the molds includes an articulated arm that draws a vacuum wherein the articulated arm contacts the exterior surface of the food substance in the mold, applies a vacuum to the exterior surface of the food substance that is sufficient to remove the food substance from the mold, transports the food substance to a conveyor belt, and deposits the food substance on the conveyor belt by releasing the vacuum.

The roller may be chilled to a temperature of between about 5° C. and −25° C. The molds may be removed from the chilled roller.

The invention further relates to methods of molding food products. In one embodiment the method involves the steps of sequentially depositing a solidifiable food substance into one or more of a plurality of molds that are attached radially to a chilled roller while the molds are in a substantially horizontal position to provide one or more molds filled with the food substance having an exterior surface wherein the temperature of the roller is sufficiently low to at least partly solidify the food substance when it is in the mold, rotating the chilled roller to move the one or more filled molds from the substantially horizontal position so that the exterior surface of the food substance contacts a conveyor belt sufficiently soon after the food substance is deposited in the mold to prevent the exterior surface of the food substance from being distorted as the molds moves away from the substantially horizontal position, and separating the at least partly solidifed food substance from the molds onto the conveyor belt.

The at least partly solidified food substance may be separated from the mold by introducing compressed air into a cavity behind each mold or introducing compressed air through air nozzles at the bottom of each mold.

A second embodiment of the method for molding food products involves the steps of sequentially depositing a solidifiable food substance into one or more of a plurality of molds that are radially attached to a chilled roller while the molds are in a substantially horizontal position to provide one or more molds filled with a food substance having an exterior surface wherein the temperature of the roller is sufficiently low to at least partly solidify the food substance when it is in the mold, lowering a chilled plate onto the molds when the molds are being filled with the solidifiable food substance so that the chilled plate contacts the mold and the exterior surface of the food substance to at least partially solidify the exterior surface of the food substance, removing the chilled plate from the molds, rotating the chilled roller, and separating the at least partly solidified food substance from the molds.

The at least partly solidified food substance may be separated from the molds by introducing compressed air into a cavity behind each mold or introducing compressed air through air nozzles at the bottom of each mold. The at least partially solidified food substance also may be separated from the molds by applying a sufficient vacuum to the exterior surface of the partially solidified food substance to pull the food substance from the molds. The vacuum is provided by a vacuum source positioned under a perforated conveyor belt and the vacuum is applied as the molds containing the partially solidified food substance passes over the conveyor belt.

The roller may be chilled to maintain a temperature of between about 5 and −25° C. The solidifiable food substance may be a chocolate or a fat-based confection.

DETAILED DESCRIPTION OF THE PREFERRED EMBODIMENTS

The present invention provides methods and apparatuses for manufacturing a molded food product wherein the molded product is not linked with a web, as in the prior art processes. Thus, the invention avoids the problems associated with prior art processes that link the product with a web. The method of the invention also produces a molded confectionery product that does not require further processing after molding.

Figure 1:
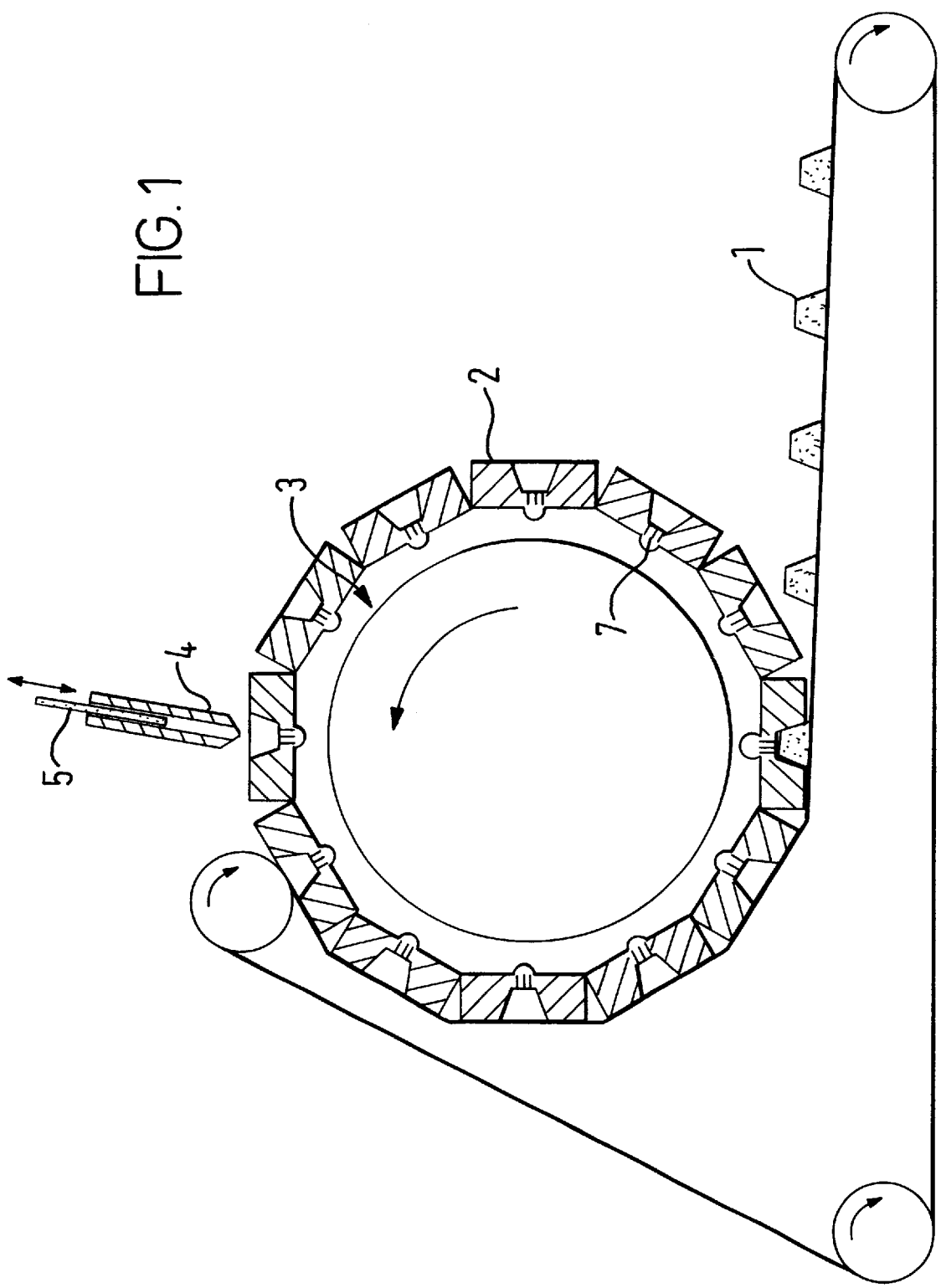
FIG. 1 is a schematic drawing of one embodiment of an apparatus for carrying out the method of the invention.

FIG. 1 shows an apparatus for molding a food product 1 according to the invention. The apparatus comprises a plurality of molds 2 that are attached radially to the surface of a chilled roller 3. A depositor 4 is provided to deposit a solidifiable food substance 5 into one or more of the molds when the molds are in a substantially horizontal position to provide one or more molds filled with a solidifiable food substance. By solidifiable food substance is meant a food substance that is fluid at the temperature at which it is introduced into the molds but is a solid at the temperature of the chilled roller 3 and molds 2. A motor (not shown) is arranged to rotate the chilled roller 3 in the direction shown by the arrow. In one embodiment the roller 3 rotates continuously while the depositor system reciprocates in a horizontal direction so that there is a static relationship between the molds 5 and the depositor 4 during the time that the solidifiable food substance is being deposited into the molds. In another embodiment the rotation of the roller 3 is linked to the depositing cycle. The roller 3 rotates to position the molds under the depositor 4 and stops while the depositor 4 deposits the solidifiable food substance 5 into the molds 2. After the food substance 5 has been deposited in the molds 2 the roller 3 starts to rotate again to advance one or more other empty molds 2 under the depositor 4.

A conveyor belt 8 is provided in contact with the exterior surface of the food substance 5 in the molds sufficiently soon after the solidifiable food substance is deposited in the molds to prevent the exterior surface of the food substance from being distorted as the filled molds 2 move away from the horizontal position. By exterior surface of the food substance is meant the surface of the food substance that is not exposed to a surface of the mold when the food substance is in the mold. The conveyor belt 8 wraps around the periphery of the molds and prevents the exterior surface of the deposited food substance from sagging as the molds rotate away from the horizontal position. Preferably the conveyor belt is arranged to contact the exterior surface of the food substance before the molds have moved more than about 90 degrees with respect to their position when they were being filled with the solidifiable food substance and more preferably before the molds have moved more than 60 degrees with respect to their position when they were being filled with the solidifiable food substance. Preferably, the conveyor belt remains in contact with the molds and the exterior surface of the food substance for an angular motion of the molds of at least about 90 degrees and more preferably at least about 120 degrees before the food substance is separated from the molds.

The chilled roller 3 at least partially solidifies the solidifiable food substance 5 after it is deposited into the molds and before it is ejected onto the conveyor belt 8 by ejection means 7 to provide a food product 1 in a preformed shape. Preferably, the ejection means is compressed air. The compressed air is introduced into a cavity behind each mold or is introduced through air nozzles at the bottom of each mold. In some cases, the conveyor belt can be used to separate the food product from the molds. For example, sticky substances such as high-boiled sweets or chocolate can adhere to the conveyor belt and can be simply removed without the need to employ an ejection means. Optionally, a release agent, such as food grade oil, may be used to aid release of the food product 1 from the molds 2. The release agent is coated on the surfaces of the molds that contact the food substance. By release agent is meant any material that reduces the tendency of the food substance to adhere to the surface of the mold. Any release agent available to those of ordinary skill in the art may be used according to the invention.

The method for making a molded food product with the apparatus of FIG. 1 comprises sequentially depositing a solidifiable food substance 5 into one or more of a plurality of molds 2 that are radially attached to a chilled roller 3 while the molds are in a substantially horizontal position to provide one or more molds 2 filled with the food substance 5 having an exterior surface. The temperature of the roller is sufficiently low to at least partially solidify the food substance in the molds. The roller 3 is then rotated so that the molds 2 with the food substance 5 is rotated from the substantially horizontal position so that the exterior surface of the food substance contacts a conveyor belt. The exterior surface of the food substance contacts the conveyor belt sufficiently soon after the food substance is deposited in the molds to prevent the exterior surface of the food substance from being distorted as the molds move away from the substantially horizontal position. The at least partially solidifed food substance is then separated from the molds onto the conveyor belt.

Figure 2:
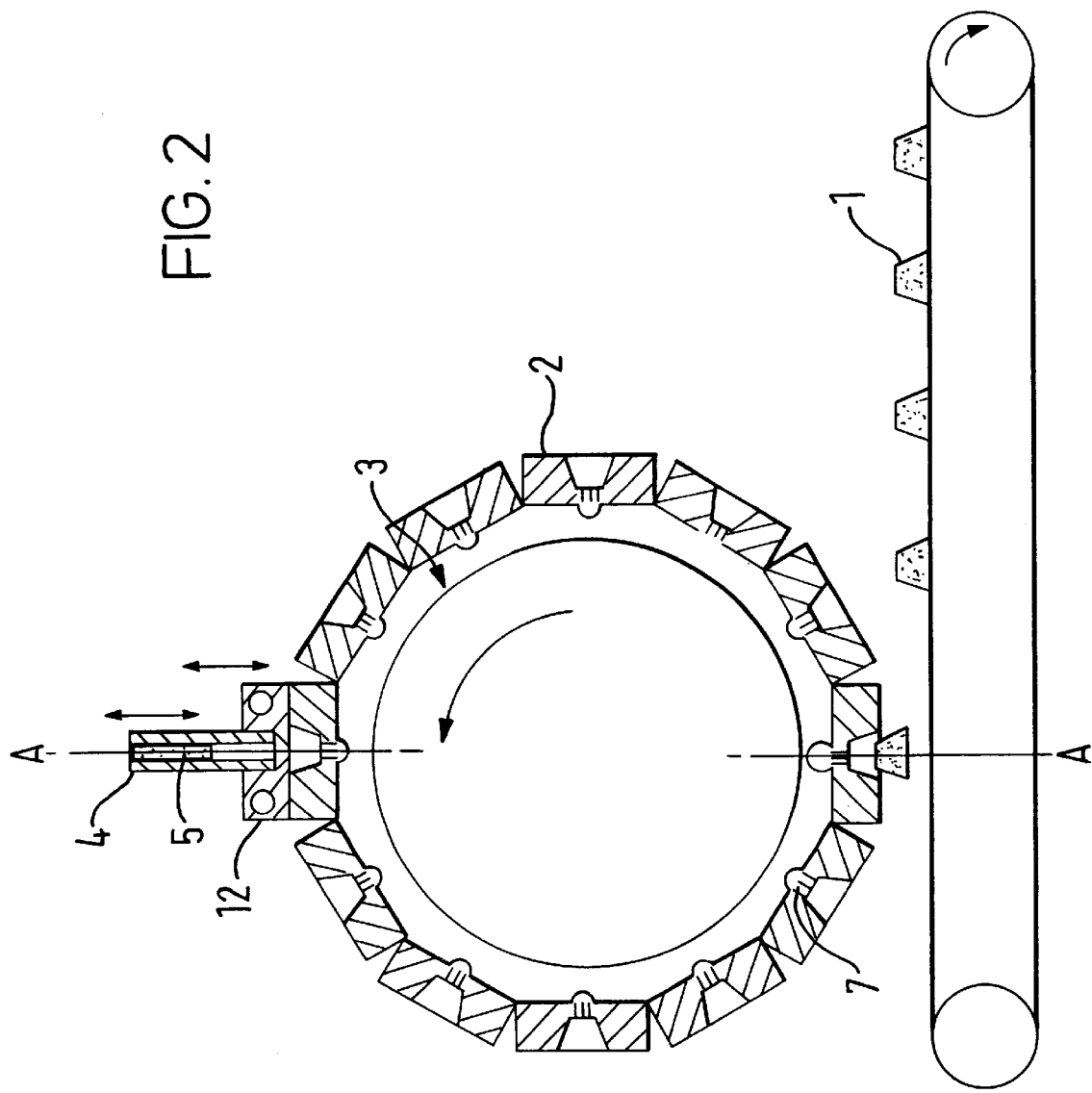
FIG. 2 is a schematic drawing of a second embodiment of an apparatus for carrying out the method of the invention.

FIG. 2 depicts a second apparatus for molding a food product according to the invention. The apparatus comprises a plurality of molds 2 attached to a chilled roller 3. A depositor 4 is provided for depositing a solidifiable food substance 5 into one or more of a plurality of molds 2 that are radially attached to a chilled roller 3 when the molds are in a substantially horizontal position. A chilled plate 12 is arranged to be lowered and to contact the mold when the solidifiable food substance is deposited in the molds. The chilled plate 12 also contacts the exterior surface of the food substance when the molds are filled and sufficiently solidifies the exterior surface of the food substance so that the food substance resists sagging when the mold is moved from a substantially horizontal position. Thus, in this embodiment a conveyor belt is not required. A motor (not shown) is arranged to rotate the chilled roller 3 in the direction of the arrow. Depositing the solidifiable food substance in the molds is coordinated with the incremental rotation of the roller 3. The roller 3 rotates to advance one or more molds 2 beneath the depositor 4 and then stops while the depositor 4 fills the molds 2 with the solidifiable food substance 5. After the molds 2 are filled the roller 3 rotates to advance one or more other molds 2 under the depositor 4. The chilled roller 3 at least partially solidifies the solidifiable food substance after it is deposited in the molds and before it is ejected from the mold by ejection means 7 to provide a food product 1 in a preformed shape. Preferably, the ejection means is compressed air. The compressed air is introduced into a cavity behind each mold or is introduced through air nozzles at the bottom of each mold. Optionally, a release agent, such as food grade oil, may be used to aid release of the food product 1 from the mold 2. The release agent is coated on the surfaces of the molds that contacts the food substance. A conveyor belt 13 may optionally be present to collect the molded food product after ejection.

The method for making a molded food product with the apparatus of FIG. 2 involves sequentially depositing a solidifiable food substance into one or more of a plurality of molds that are radially attached to a chilled roller while the molds are in a substantially horizontal position to provide one or more molds filled with a food substance having an exterior surface. The temperature of the roller is sufficiently low to at least partly solidify the food substance in the molds. A chilled plate is lowered onto the molds when the molds are being filled so that the chilled plate contacts the molds and the exterior surface of the food substance to at least partially solidify the exterior surface of the food substance. The chilled plate is then moved away from the molds, the chilled roller is rotated, and the at least partly solidified food substance is separated from the molds.

Figure 4:
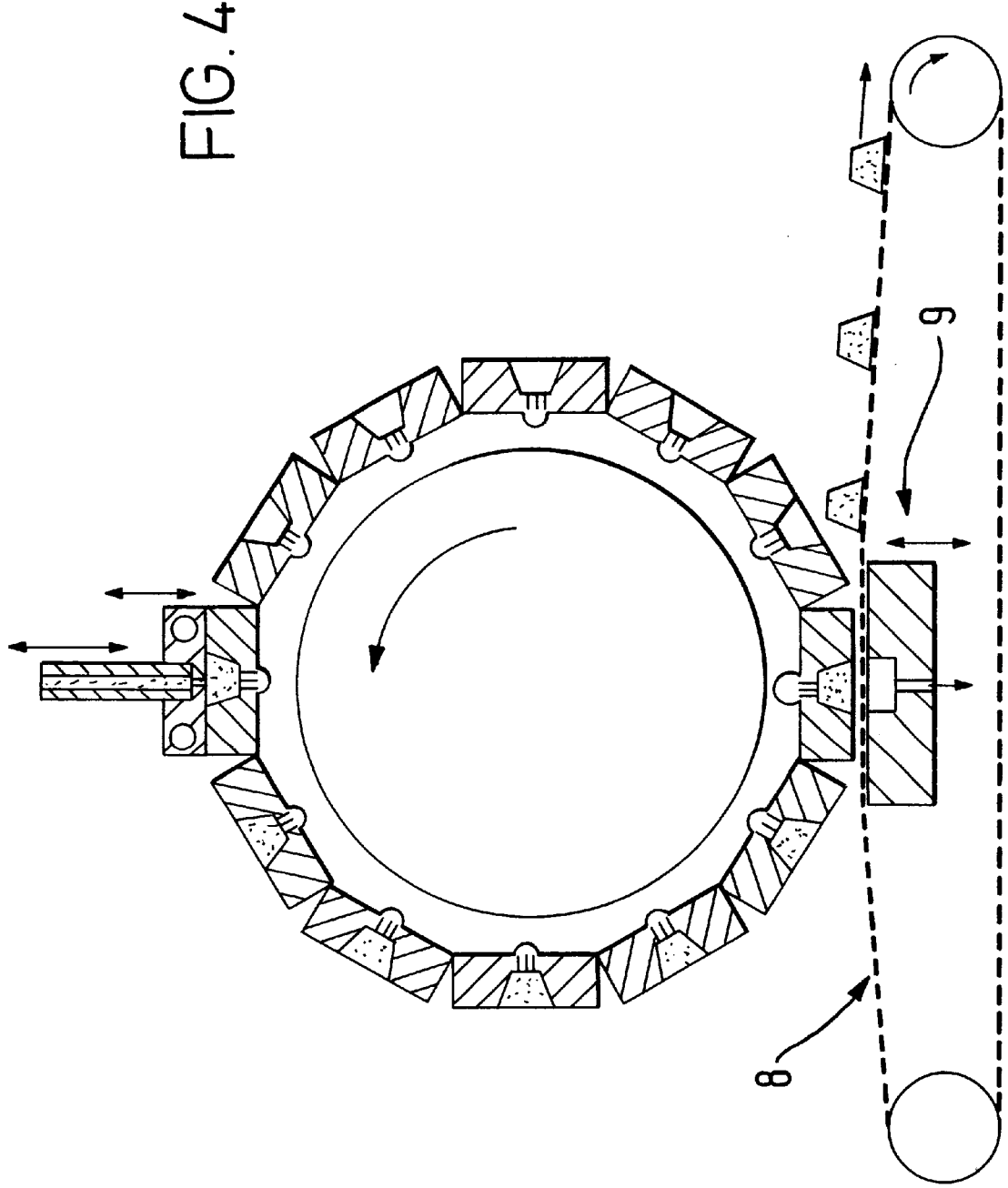
FIG. 4 is a schematic drawing of a second embodiment of FIG. 2.

FIG. 4 shows an alternative embodiment of the invention wherein the ejection means comprise a perforated conveyor belt 8 through which a vacuum is drawn from a vacuum source 9. The conveyor belt 8 includes a plurality of evenly distributed apertures. The belt is passed along the molds and sufficiently close to the food product to ensure adherence of the food product to the belt when the vacuum is applied. The vacuum source 9 is located at the position where the conveyor belt collects the molded food product and is positioned on the side of the conveyor belt opposite to the side of contact with the food product. The vacuum source includes a vacuum chamber with a cavity of sufficient size to ensure that the applied vacuum is distributed over the exterior surface of the molded partially solidified food substance. The vacuum pulls the food product out of the mold. Preferably, the vacuum source is positioned so that the vacuum pulls the food product out of the mold when the mold is in a horizontal position and the mold is upside down, i.e, the exterior surface of the food substance is pointed downward. The vacuum source 9 is reciprocated upwardly each time the roller 3 positions the molds 2 at a location that is vertical to the vacuum chamber 9. The depositing cycle and the vacuum cycle may be coordinated according to the incremental motion of the roller so that solidifiable food substance 5 is deposited in molds 2 at the same time food product 1 is ejected.

Figure 5:
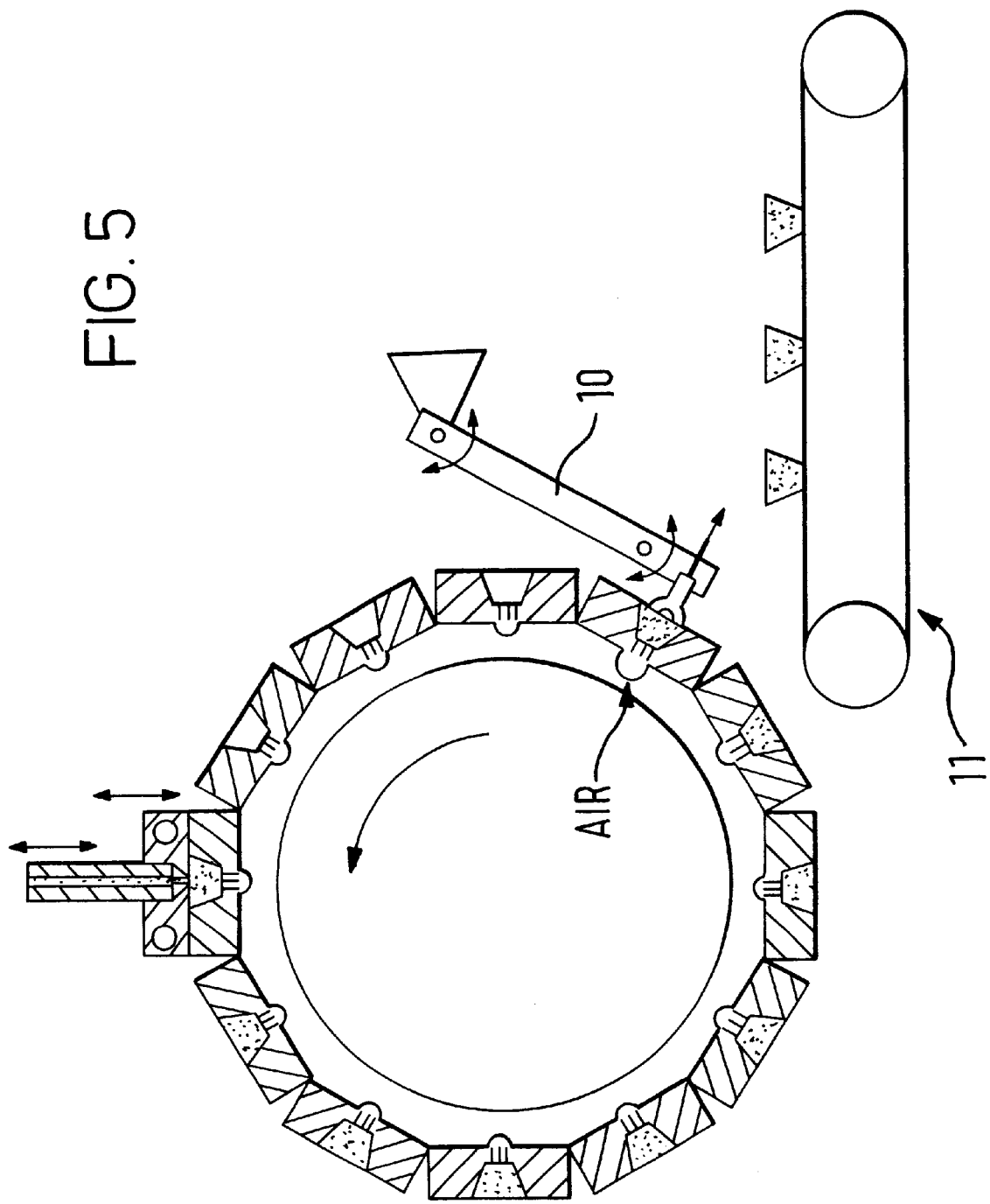
FIG. 5 is a schematic drawing of a third embodiment of FIG. 2.

FIG. 5 shows another variant of the apparatus of the invention wherein the ejection means comprises an articulated arm 10 that draws a vacuum sufficient to remove the food product from the mold and to transport the molded food to a conveyor belt 8. In this embodiment an articulated arm 10 contacts the exterior surface of the food substance in the mold 2 and applies a vacuum to the exterior surface of the food substance that is sufficient to remove the food substance from the mold 2. After the food substance is removed from the mold the articulated arm 10 transports the food substance to a conveyor belt 8 and deposits the food product 1 on the conveyor belt by releasing the vacuum.

The externally drawn vacuum, in accordance with FIGS. 4 and 5, can be used in combination with compressed air to eject the food product 1 from the mold 2. The vacuum and compressed air can be generated simultaneously from the same vacuum source.

The conveyor belt may be of plastic laminated construction and the series of molds may be metallic. Preferably the roller revolves slowly. For chocolate and fat-based confections the preferred rotation speed of the roller is between about 1 and 4 revolutions per minute.

Figure 3:
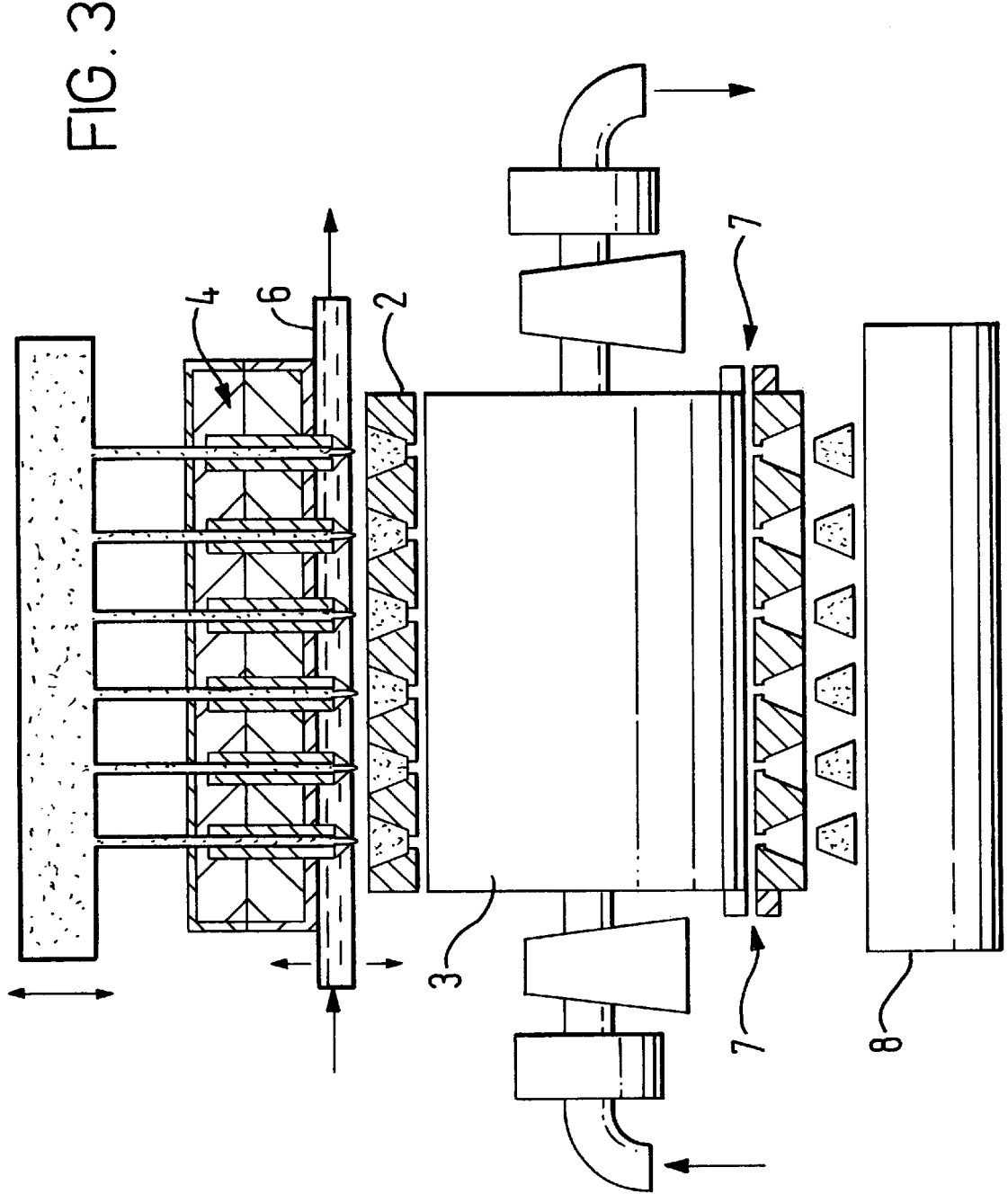
FIG. 3 is a cross-section through line A—A of FIG. 2.

It is also preferable that the roller is chilled to maintain a cavity temperature in the range of about 5° C. to −25° C. The roller can be cooled, for example, by a coolant 11a circulating through the roller as shown in FIG. 3. Preferably, the coolant comprises a glycol/water mixture and the molds are cooled by heat conduction to the roller. Preferably, air conditioning is provided around the chilled roller in order to avoid condensation and ice formation. The chilled plate is also cooled by circulation of a coolant 11b. The coolant may also be a water/glycol mixture.

In accordance with both embodiments of the present invention the plurality of molds are arranged radially on the outer circumference of the chilled roller. Preferably, the molds are removable molds that can be separated from the chilled roller. By using removable molds a variety of differently shaped food products can easily be produced by simply changing the type of mold. In one embodiment the mold is a single unit having one or more recesses defined therein that is arranged co-axially with respect to the chilled roller. In another embodiment individual molds, each with an individual recess, are arranged adjacent to each other and co-axially with respect to the chilled roller. When a single mold with a plurality of recesses or a series of individual molds arranged co-axially with respect to the chilled roller are used the depositor is arranged so that the solidifiable food substance is deposited into each of the plurality of recesses or into each individual mold at the same time. Each mold has a large surface area in contact with the chilled roller to enable heat transfer by conduction from the mold to the chilled roller. Thus, the molds and chilled roller are made of material having good conductive properties.

FIG. 3 is a cross-sectional view through line A—A of FIG. 2 and depicts an embodiment of the apparatus wherein a series of molds 2 are arranged adjacent to each other and co-axially with respect to the chilled roller 3 and the depositor 4 is arranged so that the food substance is deposited by a series of individual depositors into each of the molds 2 at the same time.

Preferably, the food substance is a warm fluid confectionery solution or includes food ingredients that are thermosetting, such as chocolate or high-boiled sugar. Thus, the food substance is solidifiable and is partially solidified when it contacts the mold that is cooled by the chilled roller. This forms a skin on the outer surface of the food substance, even though it may not be solidified at the center, and facilitates the easy removal of the at least partially solidified food product from the molds.

The invention is particularly suitable for food products, such as gels, gums, high-boiled sweets, and chocolate or other fat-based confectionery products such as pralines. Preferably, the solidifiable food substance solidifies at a temperature between about 20° C. and 50° C., preferably between about 20° C. and 40° C., and most preferably between about 20° C. and 30° C. The temperature of the solidifiable food substance when it is deposited in the mold as a liquid and the temperature of the chilled roller will depend on the composition of the food substance and can be readily determined by one of ordinary skill in the art.

The method of the present invention enables fewer molds to be used compared to traditional methods that may require the use of as many as several thousand molds. Thus, less of an investment is necessary with the process of the invention. Furthermore, by using removable molds the process of the invention provides a more cost effective way to change the shape of the food product being produced. The apparatuses of the present invention also provide a significant reduction in floor space compared to traditional methods and thus are more cost effective. The rapid cooling achieved by conductive heat transfer also provides high output and reduces changes in the food substance that may occur during cooling, such as, for example sugar inversion. In addition the reduced mechanical complexity of the apparatuses of the invention lowers investment and maintenance costs.

DEPOSIT OF COMPUTER PROGRAM LISTINGS

Not applicable

What is claimed is:

1. A food product molding apparatus comprising:
   a chilled roller;
   a plurality of molds attached radially to the surface of the chilled roller;
   a depositor for sequentially depositing a solidifiable food substance into one or more of the molds when the molds are in a substantially horizontal position to provide one or more molds filled with a food substance having an exterior surface;
   a conveyor belt arranged to contact the exterior surface of the food substance in the molds sufficiently soon after the solidifiable food substance is deposited into the molds to prevent the exterior surface of the food substance from being distorted as the molds move away from the horizontal position; and
   means for separating the food substance from the molds, wherein the temperature of the chilled roller is sufficiently low to at least partially solidify the solidifiable food substance before it is separated from the mold.

2. The apparatus of claim 1, wherein the conveyor belt is arranged to contact the exterior surface of the food substance before the molds have moved more than 90 degrees with respect to their position during depositing.

3. The apparatus of claim 2, wherein the conveyor belt is arranged to contact the exterior surface of the food substance before the molds have moved more than 60 degrees with respect to their position during depositing.

4. The apparatus of claim 1, wherein the conveyor belt remains in contact with the exterior surface of the food substance during an angular motion of the molds of at least 90 degrees before the food substance is separated from the molds.

5. The apparatus of claim 4, wherein the conveyor belt remains in contact with the exterior surface of the food substance during an angular motion of the molds of at least 120 degrees before the food substance is separated from the molds.

6. The apparatus of claim 1, wherein the means for separating the at least partially solidifed food substance comprises introducing compressed air into a cavity behind each mold or introducing compressed air through air nozzles at the bottom of each mold.

7. The apparatus of claim 1, wherein the roller is chilled to maintain a temperature of between about 5° C. and −25° C.

8. The apparatus of claims 1, wherein the molds can be removed from the chilled roller.

9. A method of molding a food product comprising:
   sequentially depositing a solidifiable food substance into one or more of a plurality of molds that are attached radially to a chilled roller while the molds are in a substantially horizontal position to provide one or more molds filled with the food substance having an exterior surface wherein the temperature of the roller is sufficiently low to at least partly solidify the food substance;
   rotating the chilled roller to move the one or more filled molds from the substantially horizontal position so that the exterior surface of the food substance contacts a conveyor belt sufficiently soon after the food substance is deposited in the mold to prevent the exterior surface of the food substance from being distorted as the molds moves away from the substantially horizontal position; and
   separating the at least partly solidifed food substance from the molds onto the conveyor belt.

10. The method of claim 9, wherein separating the at least partly solidified food substance from the molds comprises introducing compressed air into a cavity behind each mold or introducing compressed air through air nozzles at the bottom of each mold.

11. The method of claim 9, wherein the roller is chilled to maintain a temperature of between about 5° C. and −25° C.

12. The method of claim 9, wherein the food substance is a high-boiled sugar, a chocolate, or a fat-based confection.

* * * * *